United States Patent
Sankaran et al.

(10) Patent No.: US 11,652,753 B2
(45) Date of Patent: May 16, 2023

(54) LINK AGGREGATION GROUP OPTIMIZATION

(71) Applicant: HEWLETT PACKARD ENTERPRISE DEVELOPMENT LP, Houston, TX (US)

(72) Inventors: Ram Sankaran, Bangalore (IN); Srinivas Chinnam, Bangalore (IN); Thirumala Baladas Kunda, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 124 days.

(21) Appl. No.: 17/221,818

(22) Filed: Apr. 4, 2021

(65) Prior Publication Data

US 2022/0038382 A1 Feb. 3, 2022

(30) Foreign Application Priority Data

Jul. 29, 2020 (IN) .............................. 202041032558

(51) Int. Cl.
*H04L 47/41* (2022.01)
*H04L 43/0894* (2022.01)

(52) U.S. Cl.
CPC .......... *H04L 47/41* (2013.01); *H04L 43/0894* (2013.01)

(58) Field of Classification Search
CPC ............................ H04L 47/41; H04L 43/0894
See application file for complete search history.

(56) References Cited

U.S. PATENT DOCUMENTS

| | | | |
|---|---|---|---|
| 7,835,362 B2 * | 11/2010 | Libby | H04L 45/245 370/394 |
| 8,917,724 B2 | 12/2014 | Thyni et al. | |
| 9,538,264 B2 * | 1/2017 | Surek | H04L 41/0896 |
| 10,063,383 B1 * | 8/2018 | Kanakarajan | H04L 47/125 |

(Continued)

FOREIGN PATENT DOCUMENTS

CN 107920021 A 4/2018

OTHER PUBLICATIONS

Galán-Jiménez, J. et al., "Designing Energy-efficient Link Aggregation Groups," Ad Hoc Networks, vol. 25, Feb. 2015, pp. 595-605, https://dl.acm.org/doi/abs/10.1016/j.adhoc.2014.11.005.

*Primary Examiner* — Chi H Pham
*Assistant Examiner* — Weibin Huang
(74) *Attorney, Agent, or Firm* — Hewlett Packard Enterprise Patent Department (57) ABSTRACT

Examples disclosed herein relate to a method comprising detecting a plurality of port sets between a first networking device with a first plurality of ports and a second networking device with a second plurality of ports, wherein each port set includes a first and second port of the first device having a same available interface rate. The method may comprise determining an interface rate and an operational state for each port set that is available to form a Link Aggregation Group and determining each grouping of port sets between the first and second device, wherein each grouping has at least one port set and each port set in the grouping has a same interface rate. The method may comprise calculating the interface rate for each grouping, determining a group with a highest interface rate from among the groupings and programing ports of the group into the LAG distribution.

20 Claims, 6 Drawing Sheets

(56) References Cited

U.S. PATENT DOCUMENTS

| | | | |
|---|---|---|---|
| 10,382,321 B1 | 8/2019 | Boyapati et al. | |
| 10,581,688 B2 | 3/2020 | Li et al. | |
| 10,652,140 B2* | 5/2020 | Hallivuori | H04L 45/745 |
| 2008/0291826 A1* | 11/2008 | Licardie | H04L 47/32 |
| | | | 370/230 |
| 2009/0080328 A1* | 3/2009 | Hu | H04L 47/30 |
| | | | 370/230 |
| 2013/0250829 A1* | 9/2013 | Kurokawa | H04L 12/12 |
| | | | 370/311 |
| 2016/0337259 A1* | 11/2016 | Li | H04L 47/70 |
| 2017/0085467 A1 | 3/2017 | Ford et al. | |
| 2020/0076718 A1 | 3/2020 | Khan et al. | |
| 2020/0169510 A1* | 5/2020 | Kadosh | H04L 47/215 |

* cited by examiner

LINK AGGREGATION GROUP OPTIMIZATION

BACKGROUND

A link aggregation group (LAG) is point-to-point link between a pair of network devices. Traffic may get load balanced among interfaces of the LAG, in order to help increase the aggregate bandwidth and improve link failure recovery.

BRIEF DESCRIPTION OF THE DRAWINGS

Some implementations of the present disclosure are described with respect to the following figures.

FIG. 1B is a block diagram of an example system for link aggregation group optimization.

FIG. 1 c is a block diagram of an example system of an example environment in which link aggregation group optimization may be useful.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a" "an", or the is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Link aggregation (LAG) is point-to-point link between a pair of network devices. Traffic may get load balanced among interfaces of the LAG, in order to help increase the aggregate bandwidth and improve link failure recovery.

In networking, link aggregation applies to various methods of combining, or aggregating, multiple network connections in parallel. Link aggregation may be used to increase throughput beyond what a single connection could sustain and to provide redundancy. A Link Aggregation group (LAG) may combine a number of physical ports of a network device together to make a single high bandwidth data path. One of the key requirements in all LAG implementation is that all the ports used in aggregation consist of the same physical type, such as all copper ports (10/100/1000), all multi-mode fiber ports or all single mode fiber ports of the same operational speed.

Many devices support many different physical types of ports having different speeds/bandwidth. (100 Mbps/1G/ 2.5G/5G/10G/40G). If the user connects multiple ports between two or more devices, there is a possibility of a mismatch in the interface rates of the ports configured to be part of LAG.

In the event that a lower speed port initially becomes part of the LAG, it sets the operational speed of the member port of the LAG. The value set is equal to that of the port speed which joins the LAG first. Once set, any other port having an interface speed not equal to this value may not be able to join the LAG. There may also be scenarios where interfaces with different speeds are attempted to be grouped in the same Link Aggregation group. In such cases, there is probability that higher speed interfaces cannot join the Link Aggregation Group and hence are in an unusable state.

This issue may be exacerbated in deployments where pre-provisioning is exercised. When pre-provisioning is exercised, the user is allowed to pre-configure interfaces before inserting or attaching a module in the networking device. So while the end user may provision a set of ports to be part of the LAG, the user may not be able to pre-determine what may be the operational interface rate of these ports.

Pre-provisioning and growing introduction of multi-mode interfaces types may increase the probability of hitting scenarios where there is port-interface rate mismatch between the interfaces configured to be part of the same LAG. Hence, the optimum configuration may not get applied. Manual intervention may be needed to address the configuration, which may not be an adequate solution in environments with large numbers of devices.

The systems and methods described herein optimize the existing selection process of links configured to be part of the link aggregation group in a multi-rate environment while following standard protocol for link aggregation where links configured to be part of a link aggregation group are of the same interface speed.

The systems and methods described address this problem by introducing a selection method to identify the best link/links among the links configured to be part of the Link aggregation group.

This systems and methods described also address network events which can alter the state/properties of the links configured to be part of the Link Aggregation Group and ensure that the most optimized link/links are made members of the Link Aggregation Group.

In at least one embodiment, the subject matter claimed below includes a method. The method may comprise detecting a plurality of port sets between a first networking device with a first plurality of ports and a second networking device with a second plurality of ports, wherein each port set includes a first port of the first device and a second port of the second device having a same available interface rate. The method may comprise determining an interface rate and an operational state for each port set that is available to form a Link Aggregation Group and determining each grouping of port sets between the first and second device, wherein each grouping has at least one port set and each port set in the grouping has a same interface rate. The method may also comprise calculating the interface rate for each grouping, determining a group with a highest interface rate from among the groupings and programing ports of the group into the LAG distribution.

Figure 1A:
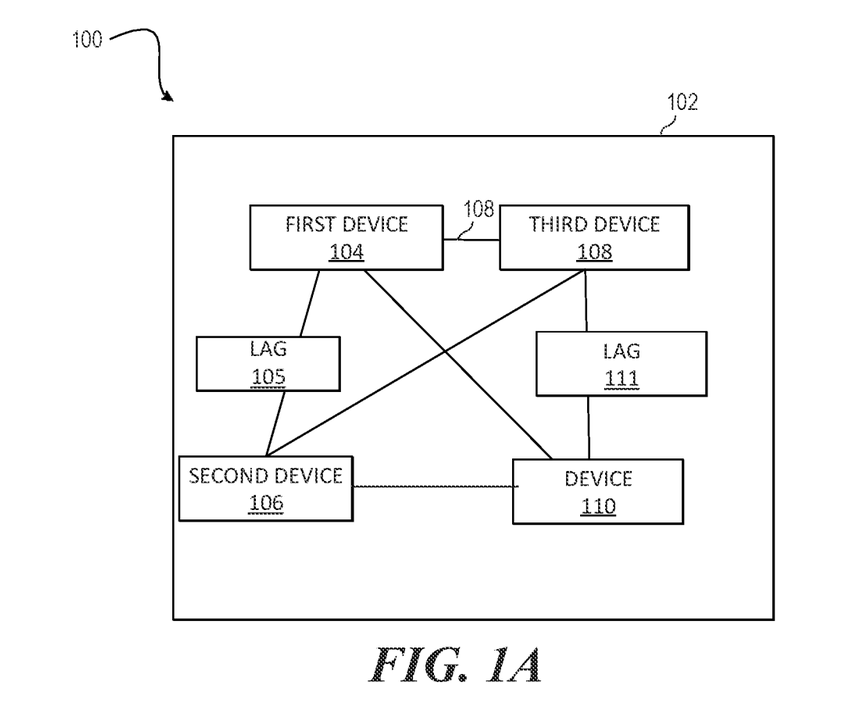
FIG. 1A is a block diagram of an example environment in which link aggregation group optimization may be useful.

FIG. 1A is a block diagram of an example environment in which link aggregation group optimization may be useful. The system 100 may include a network 102 having a plurality of devices including first device 104, second device 106, third device 108 and fourth device 110. Although only four devices are shown in system 100, this is for explanatory purposes only and any number of devices may be used in system 100.

Each of the devices 104-110 may be any number of network devices. For example, a network device may be a network switch. A switch may be a device within a network that forwards data sent by a sender device toward a recipient device (or multiple recipient devices). In some examples, a network device includes a layer 2 switch that forwards control packets (also referred to as data frames or data units) based on layer 2 addresses in the control packets. Examples of layer 2 addresses include Medium Access Control (MAC) addresses. In alternative examples, a switch includes a layer 3 router that forwards control packets based on layer 3 addresses, such as Internet Protocol (IP) addresses in the control packets.

A "packet" or "control packet" can refer to any unit of data that can be conveyed over a network. A packet or control packet may also refer to a frame or data frame, a data unit, a protocol data unit, Bridge Protocol Data Unit (BPDU) and so forth. A switch forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

A switch forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Each of the devices 104-110 may be communicatively coupled to one or more of the other devices 104-110 in system 100 via network link 108. Network link 108 and the various connections between devices 104-110 may be a physical link, such as an Ethernet connection or other physical connection, a wireless connection, a virtual connection, etc. The links may be used to form a link aggregation group (LAG).

Figure 1B:
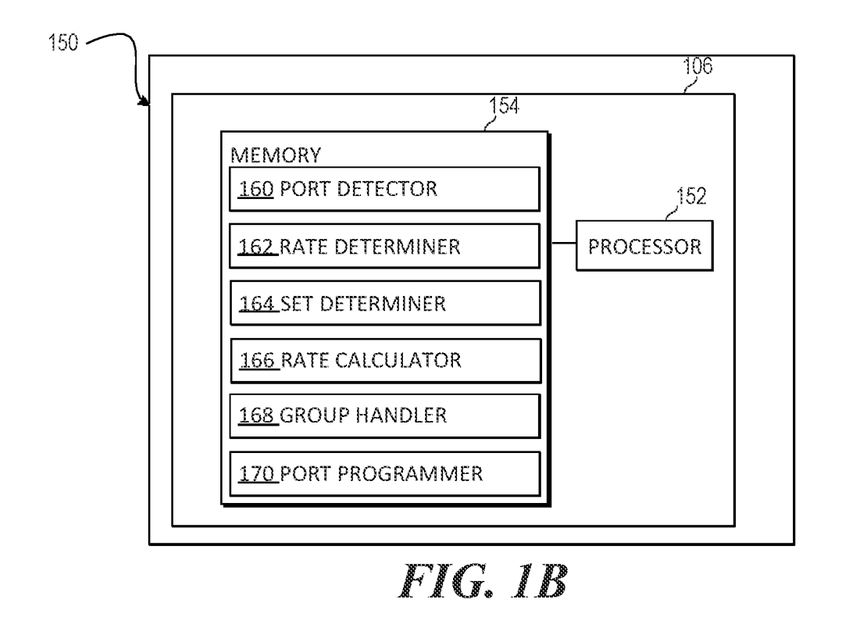

Turning now to FIG. 1B, a block diagram of an example system 150 for link aggregation group optimization is presented. System 150 may include a processor 152 and a memory 154 that may be coupled to each other through a communication link (e.g., a bus). Processor 152 may include a single or multiple Central Processing Units (CPU) or another suitable hardware processor(s). In some examples, memory 154 stores machine readable instructions executed by processor 152 for system 150. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for port detector 160, rate determiner 162, set determiner 164, rate calculator 166, group handler 168, port programmer 170 and/or other components. According to various implementations, system 150 may be implemented in hardware and/or a combination of hardware and programming that configures hardware. Furthermore, in FIG. 1 and other Figures described herein, different numbers of components or entities than depicted may be used.

Processor 152 may execute port detector 160 to detect a plurality of port sets between a first networking device with a first plurality of ports and a second networking device with a second plurality of ports. Each port set includes a first port of the first device and a second port of the second device having a same available interface rate.

Processor 152 may execute rate determiner 162 to determine an interface rate and an operational state for each port set that is available to form a Link Aggregation Group. Each port may be added to the LAG database. The LAG database is a list of all the ports configured to be part of the LAG. These include ports are operationally up/down. Within this list of ports, ports are grouped into separate groups based on the interface rate. For example, ports with an interface rate of 1 Gbps will be grouped under one group while ports having interface rate of 10 Gbps will be grouped under a separate group. Group details like (member ports/net bandwidth) may be consistently updated to reflect any network changes in the LAG.

Processor 152 may execute set determiner 164 to determine each grouping of port sets between the first and second device, wherein each grouping has at least one port set and each port set in the grouping has a same interface rate.

Processor 152 may execute rate calculator 166 to calculate the interface rate for each grouping.

Processor 152 may execute group handler 168 to determine a group with a highest interface rate from among the groupings. In some aspects, it may be determined that a first group consisting of more than one port has a higher interface rate than a second group with a single port. In some aspects, it may be determined that a first group consisting of a single port has a higher interface rate than second group with more than one port.

In some aspects, the group with the highest interface rate is not an initial group including at least one port of a first device that becomes available for LAG before each of the other ports on the device.

In some aspects, the group with the highest interface rate is a first group and processor 152 may execute group handler 168 to determine that a second group also has the highest interface rate determine which of the first and second groups has the greatest number of ports.

Processor 152 may execute port programmer 170 to program ports of the group into the LAG distribution. The LAG distribution is a list of ports which will be programmed in the hardware as part of the LAG. These ports are shortlisted and are the operational ports on which traffic meant for LAG will flow.

Figure 1C:
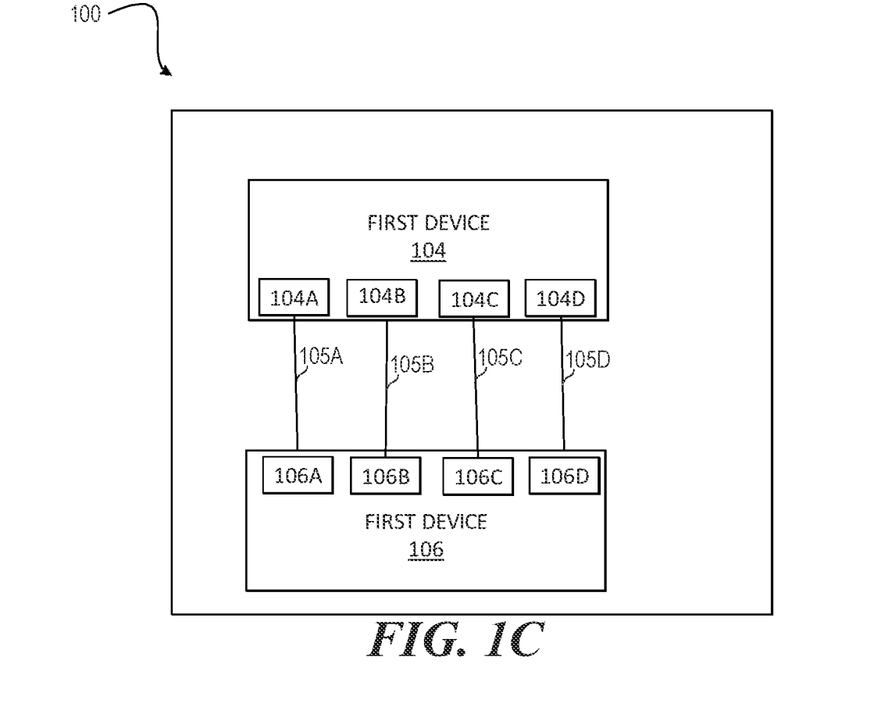

Turning now to FIG. 1C, of an example environment 100 in which link aggregation group optimization may be useful. FIG. 1C may be similar to environment 1A and one or more devices in the environment 100 may execute one more part of the system described in FIG. 1B in order to facilitate link aggregation group optimization.

Environment 100 may include first device 104 may have 4 ports 104a-d and second device 106 may have 4 ports 106a-d with links 105a-105d connected between them. Each port on first device 104 may match the interface rate of the corresponding port on second device 106. In other words, port 104a may have the same interface rate as port 106a and so on.

In one aspect, ports 104a/106a and 104b/106b may each have an interface rate of 1 Gbps and ports 104c/106c and 104d/106d may each have an interface rate of 10 Gbps. All the ports are configured to be part of the LAG. Of course, this configuration is for explanatory purposes only and the systems and methods described herein can be used in environments with any number of devices, ports and interface rates.

If port 104a/106a is added to the LAG first, then the member interface rate of the LAG may be set to 1 Gbps and only ports matching this interface rate of 1 Gbps are added to the LAG.

Accordingly, ports 104a/106a and 104b/106b will be part of the LAG. Ports 104c/106c and 104d/106d will not be part of the LAG despite having higher interface rate of 10 Gbps. In other words, the LAG consists of ports 104a/106a and 104b/106b having an effective bandwidth of 2 Gbps and ports 104c/106c and 104d/106d are in an operationally down state as they can't be part of the LAG due to this port interface rate mismatch.

In this case, the user has a LAG setup of effective bandwidth of 2 Gbps (1+1) rather than possible 20 Gbps (10+10). This is a serious disadvantage where the user is not able to leverage the hardware infrastructure available.

In some aspects, a LAG group having multiple ports may have a higher bandwidth than a LAG group with a single port. For example, in a second aspect, one or more of the devices in the environment 100 may execute a system for link aggregation optimization to address this issue. Turning again to FIG. 1C, in this aspect, ports 104a/106a and 104b/106b may each have an interface rate of 1 Gbps and ports 104c/106c and 104d/106d may each have an interface rate of 10 Gbps. Regardless of the order that the ports are added to the LAG, the port with the highest interface rate may be selected. Accordingly, ports 104c/106c and 104d/106d are selected to be part of the LAG. This ensures that the LAG formed between first device 104 and second device 106 has the higher bandwidth (20 Gbps) supported by the hardware.

In some aspects, a LAG group having a single port may have a higher bandwidth than a LAG group with multiple ports. For example, in a third aspect, one or more of the devices in the environment 100 may execute a system for link aggregation optimization to address this issue. Turning again to FIG. 1C, in this aspect, ports 104a/106a and 104b/106b may each have an interface rate of 1 Gbps and ports 104c/106c may have an interface rate of 10 Gbps and ports 104d/106d may have an interface rate of 10 Gbps.

In this aspect, ports 104a/106a and 104b/106b have the same interface rate (1 Gbps), but the combined bandwidth of the LAG consisting of these interfaces (ports 104a/106a and 104b/106b) will be equal to 2 Gbps. This is lower than the interface rate of ports 104c/106c which is 10 Gbps. Ports 104d/106d have a lower rate than ports 104c/106c. Regardless of the order that the ports are added to the LAG, ports 104c/106c to be part of the LAG.

In some aspects, LAG groups may have the same interface rate and a LAG group to use must be decided from amongst these multiple groups. One of many different tie breakers may be used in such an instance. For example, the LAG group with the highest number of ports may be selected in order to achieve the highest bandwidth and have the advantage of resiliency.

Figure 2:
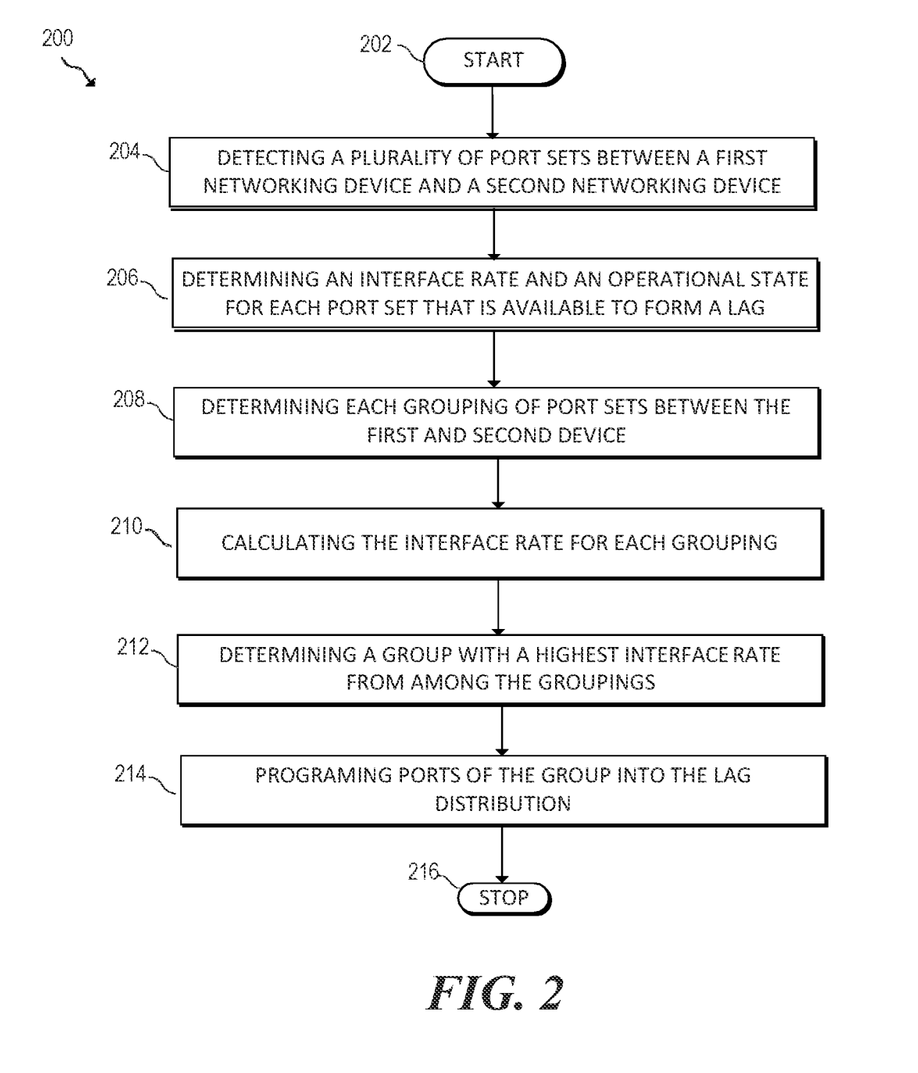
FIG. 2 is a flow diagram of an example method for link aggregation group optimization.

FIG. 2 is a flow diagram of an example method 200 for link aggregation group optimization. The environment where method 200 is performed may be similar to environment 100 and/or system 500 described above. Accordingly, parts of and/or the entire method may be performed by one or more of the devices belonging to environment 100 and/or system 500.

The method 200 may begin at block 202 and proceed to block 204, where the method may include detecting a plurality of port sets between a first networking device with a first plurality of ports and a second networking device with a second plurality of ports. Each port set may include a first port of the first device and a second port of the second device having a same available interface rate. At block 206, the method may include determining an interface rate and an operational state for each port set that is available to form a Link Aggregation Group. At block 208, the method may include determining each grouping of port sets between the first and second device, wherein each grouping has at least one port set and each port set in the grouping has a same interface rate. At block 210, the method may include calculating the interface rate for each grouping.

At block 212, the method may include determining a group with a highest interface rate from among the groupings. In some aspects, the method may include determining that a first group consisting of more than one port has a higher interface rate than a second group with a single port. In some aspects, the method may include determining that a first group consisting of a single port has a higher interface rate than second group with more than one port.

In some aspects, the method may include determining that the group with the highest interface rate is not an initial group including at least one port of a first device that becomes available for LAG before each of the other ports on the device.

In some aspects, the group with the highest interface rate is a first group, the method comprising. In these aspects, the method may include determining that a second group also has the highest interface rate and determining which of the first and second groups has the greatest number of ports. At block 214, the method may include programing ports of the group into the LAG distribution. The method may proceed to block 216, where the method may end.

Figure 3:
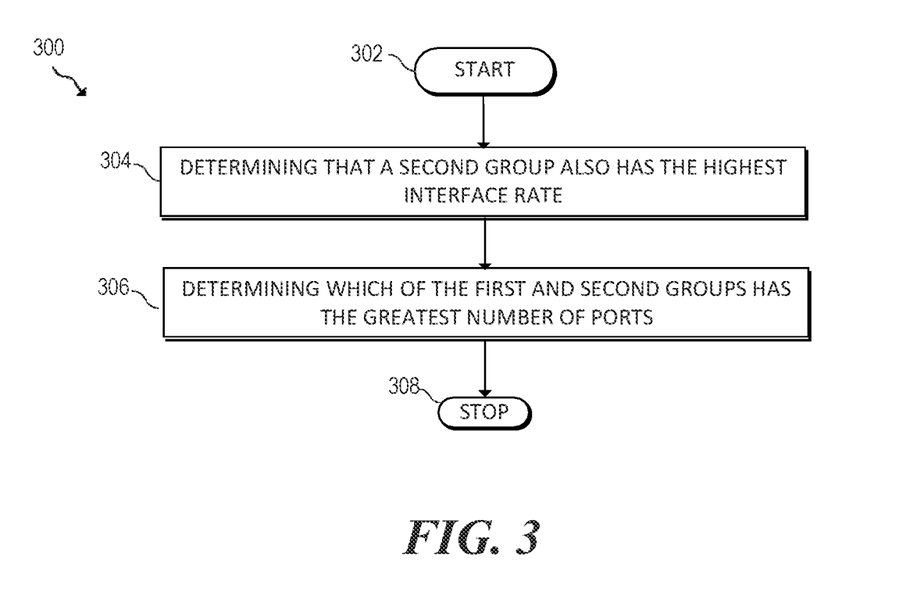
FIG. 3 is a flow diagram of another example method for link aggregation group optimization.

FIG. 3 is a flow diagram of another example method 300 for link aggregation group optimization. The environment where method 300 is performed may be similar to environment 100 described above and/or system 500. Accordingly, parts of and/or the entire method may be performed by one or more of the devices belonging to environment 100 and/or system 500. Method 300 may occur in unison with other methods discussed herein, such as method 200 and may occur, for example, at or around block 212 of method 200 described above.

The method 300 may begin at block 302 and proceed to block 304, where the method may include determining that a second group also has the highest interface rate. The method may proceed to block 306, where the method may include determine which of the first and second groups has the greatest number of ports. The method may proceed to block 308, where the method may end.

Figure 4:
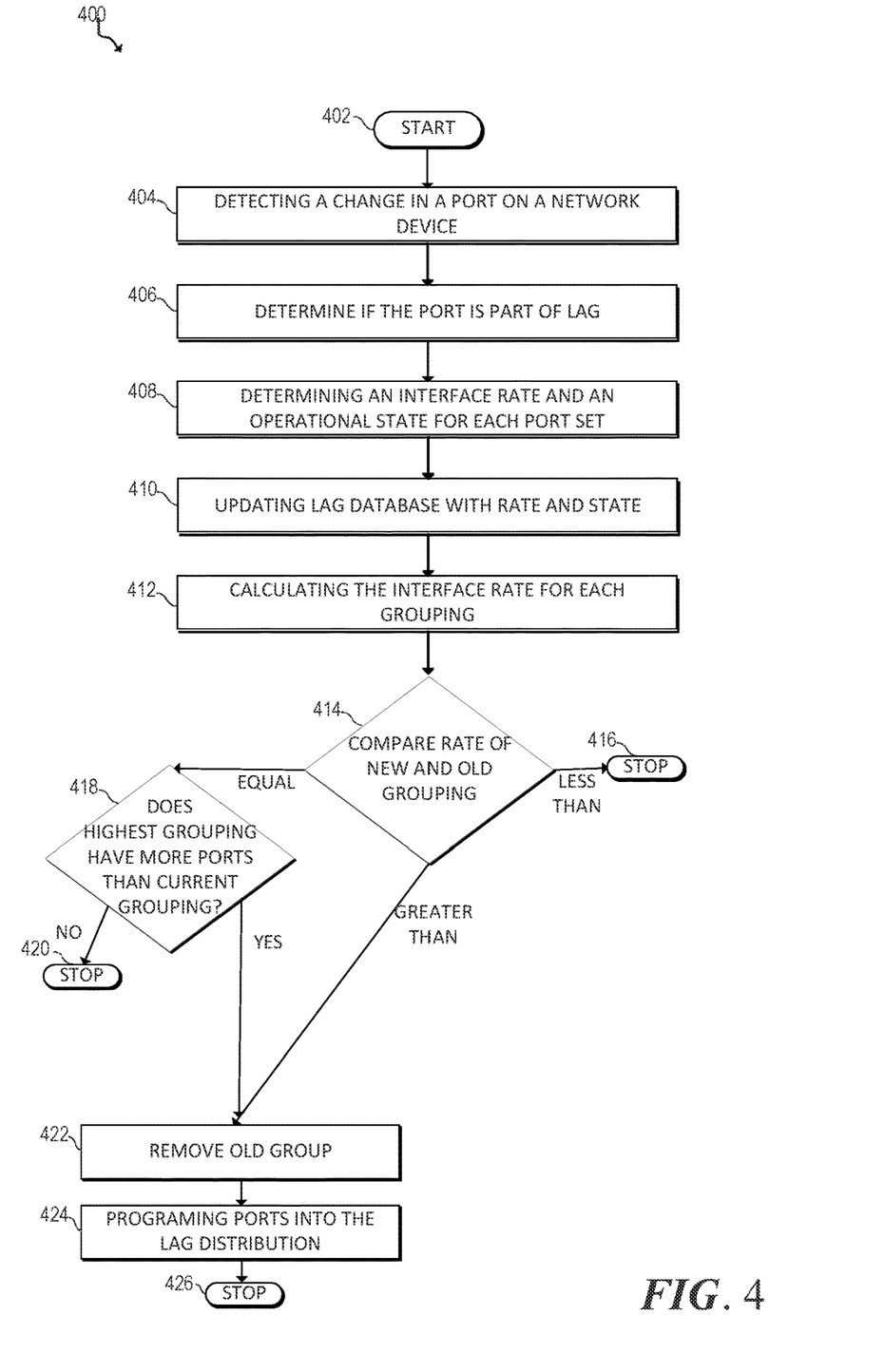
FIG. 4 is a flow diagram of another example method for link aggregation group optimization.

FIG. 4 is a flowchart of an example method 400 for link aggregation group optimization when a change has occurred. The environment where method 400 is performed may be similar to environment 100 and/or system 500 described above. Accordingly, parts of and/or the entire method may be performed by one or more of the devices belonging to environment 100 and/or system 500.

In some aspects, a configuration change made to an environment, such as environment 100 described above, may change the available ports for link aggregation. Changes may include removing a port, adding a port, making a previously unavailable port available for link aggregation, etc. In such an instance, the change is to be detected and the link aggregation groups may be updated if a faster/more reliable group is now available.

Method 400 may start at block 402 and continue to block 404, where the method 400 may include detecting that a change has been made in a port. Changes may include removing a port, adding a port, making a previously unavailable port available for link aggregation, etc. The change may be in a port that is part of a LAG grouping, a port that is part of a device that is part of a LAG grouping, a new port, a new device, a removal of a port, a removal of a device, etc. At block 406, the method may include determining if the changed port is part of an existing LAG. If the changed port is part of an existing LAG and the change is a deletion of a port, the method may include removing the port from the LAG database and/or changing the operational state of the port in the LAG database to indicate that the port is down. In these aspects, the LAG group may also be removed as the active LAG group, In aspects, where the original LAG group is still active, the method may also include checking whether that the new highest interface group is the same as the current LAG group. If that is the case, the method may make no changes to the LAG group and the method may end.

At block 408, the method may include determining an interface rate and an operational state for each port set.

At block 410, the method may include updating the lag database with interface rate and operational state of all ports.

At block 412, the method may include calculating the interface rate for each grouping. In some aspects, this may include recalculating the interface rate for each grouping based on the detection. In some aspects this may include determining each new possible grouping of port sets between the first and second device, including the new port and calculating the interface rate for each new possible grouping.

In aspects where the original LAG group is no longer active, the method may include programming the ports of the new LAG group into the LAG distribution and ending the method.

At block 414, the method may include comparing the interface rate of he calculation at block 412 with the interface rate of the current grouping.

If it is determined that the highest interface group determined in block 412 has a lower interface rate than the current LAG group (LESS THAN branch of block 414), the method may proceed to block 416, where the method may end.

If it is determined that the highest interface group determined in block 412 has an equal interface rate to the current LAG group (EQUAL branch of block 414), the method may proceed to block 418, where the method may include determined if the highest grouping (from block 412) have more ports than the current LAG grouping. If it is determined that the highest grouping of block 412 does not have more ports (NO branch of block 418), the method may proceed to block 420, where the method may end.

If it is determined that the highest grouping of block 412 does have more ports (YES branch of block 418), the method may proceed to block 422, where the method may include removing the old LAG group from the LAG distribution or otherwise indicating that the old LAG should no longer be used. The method may proceed to block 424, where the method may include programming the new LAG into the LAG distribution. The method may proceed to block 426, where the method may end.

If it is determined that the highest interface group determined in block 412 has a higher interface rate to the current LAG group (GREATER THAN branch of block 414), the method may proceed to block proceed to block 422, where the method may include removing the old LAG group from the LAG distribution or otherwise indicating that the old LAG should no longer be used. The method may proceed to block 424, where the method may include programming the new LAG into the LAG distribution. The method may proceed to block 426, where the method may end.

Figure 5:
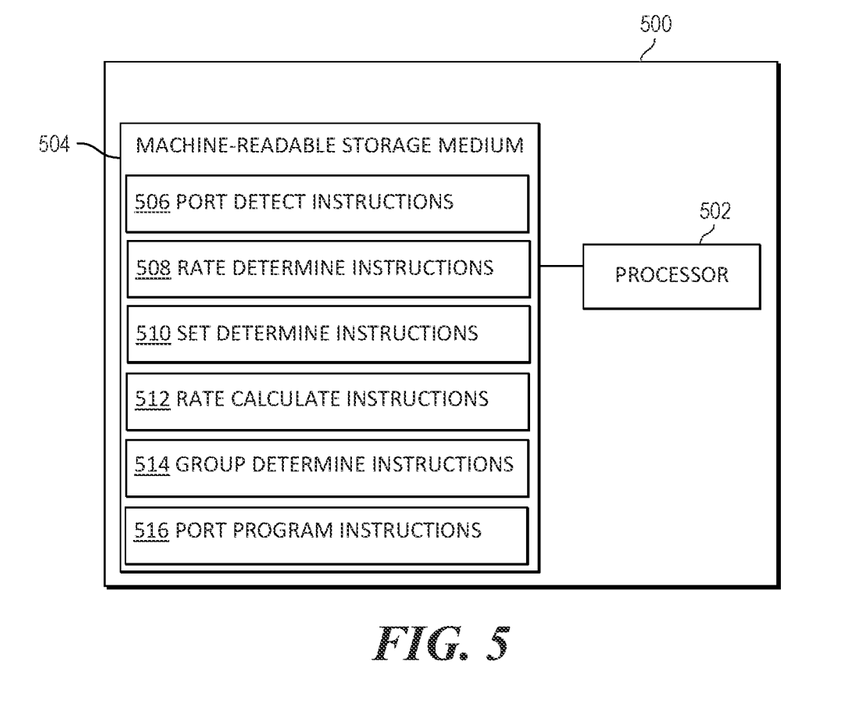
FIG. 5 is a block diagram of an example storage medium storing machine-readable instructions for link aggregation group optimization.

FIG. 5 is a block diagram of an example system 500 for link aggregation group optimization. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512, 514 and 516 for link aggregation group optimization. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, port detect instructions 506, when executed by a processor (e.g., 502), may cause system 500 to detect a plurality of port sets between a first networking device with a first plurality of ports and a second networking device with a second plurality of ports. Each port set may include a first port of the first device and a second port of the second device having a same available interface rate.

Referring to FIG. 5, rate determine instructions 506, when executed by a processor (e.g., 502), may cause system 500 to determine an interface rate and an operational state for each port set that is available to form a Link Aggregation Group.

Referring to FIG. 5, set determine instructions 506, when executed by a processor (e.g., 502), may cause system 500 to determining each grouping of port sets between the first and second device. Each grouping may include at least one port set and each port set in the grouping has a same interface rate.

Referring to FIG. 5, rate calculate instructions 506, when executed by a processor (e.g., 502), may cause system 500 to calculate the interface rate for each grouping.

Referring to FIG. 5, group determine instructions 506, when executed by a processor (e.g., 502), may cause system 500 to determine a group with a highest interface rate from among the groupings. In some aspects, the group determine instructions 506, when executed by a processor (e.g., 502), may cause system 500 to determine that a first group consisting of more than one port has a higher interface rate than a second group with a single port. In some aspects, the group determine instructions 506, when executed by a processor (e.g., 502), may cause system 500 to determine that a first group consisting of a single port has a higher interface rate than second group with more than one port.

In some aspects, the group with the highest interface rate is not an initial group including at least one port of a first device that becomes available for LAG before each of the other ports on the device.

In some aspects, the group with the highest interface rate is a first group. In these aspects, the group determine instructions 506, when executed by a processor (e.g., 502), may cause system 500 to determine that a second group also has the highest interface rate and determine which of the first and second groups has the greatest number of ports.

Referring to FIG. 5, port program instructions 506, when executed by a processor (e.g., 502), may cause system 500 to program ports of the group into the LAG distribution.

In some aspects, machine-readable storage medium 504 may store change handle instructions and port handle instructions.

Change handle instructions 506, when executed by a processor (e.g., 502), may cause system 500 to detect that a change has been made in a port belonging to one of the groupings and recalculate the interface rate for each grouping based on the detection.

Port handle instructions 506, when executed by a processor (e.g., 502), may cause system 500 to detect that a new port has been added on one of the first device and the second device, determine each new possible grouping of port sets between the first and second device, including the new port and calculate the interface rate for each new possible grouping.

The foregoing disclosure describes a number of examples for link aggregation group optimization. The disclosed examples may include systems, devices, computer-readable storage media, and methods for link aggregation group optimization. For purposes of explanation, certain examples are described with reference to the components illustrated in FIGS. 1A-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   detecting a plurality of port sets between a first networking device with a first plurality of ports and a second networking device with a second plurality of ports, wherein each port set includes a first port of the first device and a second port of the second device having a same available interface rate;
   determining an interface rate and an operational state for each port set that is available to form a Link Aggregation Group (LAG) distribution;
   determining each grouping of port sets between the first and second device, wherein each grouping has at least one port set and each port set in the grouping has a same interface rate;
   calculating the interface rate for each grouping;
   determining a group with a highest interface rate from among the groupings; and
   programming ports of the group into the LAG distribution.

2. The method of claim 1 comprising:
   determining that a first group consisting of more than one port has a higher interface rate than a second group with a single port.

3. The method of claim 1 comprising:
   determining that a first group consisting of a single port has a higher interface rate than second group with more than one port.

4. The method of claim 1 wherein, the group with the highest interface rate is not an initial group including at least one port of a first device that becomes available for LAG before each of the other ports on the device.

5. The method of claim 1 wherein the group with the highest interface rate is a first group, the method comprising:
   determining that a second group also has the highest interface rate; and
   determining which of the first and second groups has the greatest number of ports.

6. The method of claim 1 comprising:
   detecting that a change has been made in a port belonging to one of the groupings; and
   recalculating the interface rate for each grouping based on the detection.

7. The method of claim 1 comprising:
   detecting that a new port has been added on one of the first device and the second device;
   determining each new possible grouping of port sets between the first and second device, including the new port; and
   calculating the interface rate for each new possible grouping.

8. A system comprising:
   a port detector to detect a plurality of port sets between a first networking device with a first plurality of ports and a second networking device with a second plurality of ports, wherein each port set includes a first port of the first device and a second port of the second device having a same available interface rate;
   a rate determiner to determine an interface rate and an operational state for each port set that is available to form a Link Aggregation Group (LAG) distribution;
   a set determiner to determine each grouping of port sets between the first and second device, wherein each grouping has at least one port set and each port set in the grouping has a same interface rate;

a rate calculator to calculate the interface rate for each grouping;

a group handler to determine a group with a highest interface rate from among the groupings; and a port programmer to program ports of the group into the LAG distribution.

9. The system of claim 8 comprising:
the group handler to determine that a first group consisting of more than one port has a higher interface rate than a second group with a single port.

10. The system of claim 8 comprising:
the group handler to determine that a first group consisting of a single port has a higher interface rate than second group with more than one port.

11. The system of claim 8 wherein, the group with the highest interface rate is not an initial group including at least one port of a first device that becomes available for LAG before each of the other ports on the device.

12. The system of claim 8 wherein the group with the highest interface rate is a first group, the system comprising:
the group handler to:
determine that a second group also has the highest interface rate; and
determine which of the first and second groups has the greatest number of ports.

13. The system of claim 8 comprising:
a change handler to:
detect that a change has been made in a port belonging to one of the groupings; and
recalculate the interface rate for each grouping based on the detection.

14. The system of claim 8 comprising:
a port handler to:
detect that a new port has been added on one of the first device and the second device;
determine each new possible grouping of port sets between the first and second device, including the new port; and
calculate the interface rate for each new possible grouping.

15. A non-transitory machine-readable storage medium encoded with instructions, the instructions executable by a processor of a system to cause the system to:
detect a plurality of port sets between a first networking device with a first plurality of ports and a second networking device with a second plurality of ports, wherein each port set includes a first port of the first device and a second port of the second device having a same available interface rate;

determine an interface rate and an operational state for each port set that is available to form a Link Aggregation Group (LAG) distribution;

determine each grouping of port sets between the first and second device, wherein each grouping has at least one port set and each port set in the grouping has a same interface rate;

calculate the interface rate for each grouping;

determine a group with a highest interface rate from among the groupings; and program ports of the group into the LAG distribution.

16. The non-transitory machine-readable storage medium of claim 15, the instructions executable by a processor of a system to cause the system to:
the group handler to determine that a first group consisting of more than one port has a higher interface rate than a second group with a single port.

17. The non-transitory machine-readable storage medium of claim 15, the instructions executable by a processor of a system to cause the system to:
the group handler to determine that a first group consisting of a single port has a higher interface rate than second group with more than one port.

18. The non-transitory machine-readable storage medium of claim 15, wherein the group with the highest interface rate is a first group, the system comprising, the instructions executable by a processor of a system to cause the system to:
determine that a second group also has the highest interface rate; and
determine which of the first and second groups has the greatest number of ports.

19. The non-transitory machine-readable storage medium of claim 15, the instructions executable by a processor of a system to cause the system to:
detect that a change has been made in a port belonging to one of the groupings; and
recalculate the interface rate for each grouping based on the detection.

20. The non-transitory machine-readable storage medium of claim 15, the instructions executable by a processor of a system to cause the system to:
detect that a new port has been added on one of the first device and the second device;
determine each new possible grouping of port sets between the first and second device, including the new port; and
calculate the interface rate for each new possible grouping.

* * * * *